United States Patent
Engelke et al.

(12) 
(10) Patent No.: US 6,504,910 B1
(45) Date of Patent: Jan. 7, 2003

(54) VOICE AND TEXT TRANSMISSION SYSTEM

(76) Inventors: Robert Engelke, 3002 Bryn Wood Dr., Madison, WI (US) 53711; Kevin Colwell, 1411 Willow Trail, Middleton, WI (US) 53562; Troy Vitek, 1929 LaSierra Way, Madison, WI (US) 53716; Jeffrey Havens, 13 Oxford Pl., Madison, WI (US) 53704; Kurt Grittner, 1218 Bay Ridge Rd., Madison, WI (US) 53716; Dean Hofstetter, 717 Arbor Vitae Pl., Verona, WI (US) 53593; Mathew McCulley, 738 Engelhart Dr., Madison, WI (US) 53713

( * ) Notice: Subject to any disclaimer, the term of this patent is extended or adjusted under 35 U.S.C. 154(b) by 6 days.

(21) Appl. No.: 09/876,340

(22) Filed: Jun. 7, 2001

(51) Int. Cl.$^7$ .............................................. H04M 11/00
(52) U.S. Cl. ................... 379/52; 379/93.17; 379/93.08; 340/825.19
(58) Field of Search ............................... 379/52, 88.14, 379/93.05, 93.08, 93.09, 93.14, 93.15, 93.17, 93.26, 93.28; 340/825.19

(56) References Cited

U.S. PATENT DOCUMENTS 5,724,405 A * 3/1998 Engelke et al. ............... 379/52
6,307,921 B1 * 10/2001 Engelke et al. ............... 379/52

* cited by examiner

Primary Examiner—Wing Chan
(74) Attorney, Agent, or Firm—Quarles & Brady LLP

(57) ABSTRACT

A communication system and format is described for use in assisted telephonic communications, intended to help users who are hearing impaired use the telephone system. A relay connects a hearing user with the assisted user. The relay creates a text message stream containing the words spoken by the hearing user. The relay then combines the digital characters of the text message with packets of digitized voice spoken by the hearing user and sends the combined digital data packets to the station of the assisted user. The station of the assisted user is capable of separating the voice from the text and displaying the text for reading by the assisted user.

21 Claims, 2 Drawing Sheets

VOICE AND TEXT TRANSMISSION SYSTEM

CROSS-REFERENCE TO RELATED APPLICATIONS

None.

STATEMENT REGARDING FEDERALLY SPONSORED RESEARCH OR DEVELOPMENT

None.

BACKGROUND OF THE INVENTION

The present invention relates to the general field of telephone communications. In more particular, the invention relates to systems to assist telephone communications by those persons who are deaf, hard of hearing, or otherwise have impaired hearing capability.

Most modern human communications in both social and business environments takes place through sound communications. Yet within modern society there are many persons who have attenuated hearing capability. To assist those persons in making use of our telephonic communication system built for the hearing majority, there has been developed a system of telephone communication which has been principally used by the deaf community. That system makes use of a category of device known variously as a telecommunication device for the deaf (TDD), text telephone (TT) or teletype (TTY). Current TDDs are electronic devices consisting of a keyboard and a display as well as a specific type of modem, to acoustically or directly couple to the telephone line. Modern TDDs permit the user to type characters into their keyboard, with the character strings then encoded and transmitted over the telephone line to be displayed on the display of a communicating or remote TDD device.

Most TDD communication is conducted in an idiosyncratic code specific to the community of TDD users. This code, known as Baudot, evolved historically at a time when many telecommunication devices for the deaf were based on mechanical or electromechanical devices rather than the current technology based on digital electronic components. Accordingly, the Baudot protocol was constructed for a set of constraints which are no longer relevant to present date devices. The original Baudot protocol was a unidirectional or simplex system of communication conducted at 45.5 Baud. The conventional Baudot character set was a character set consisting of 5 bit characters and the system encodes the bits of those characters in a two-tonal system based on carrier tones of 1400 and 1800 Hertz.

The system of TDD communications is widely used and in fact has become indispensable to the deaf community throughout the industrialized world. Deaf persons extensively communicate with their neighbors and with other deaf and hearing people remotely, using the TDD system. In addition, systems have been developed to facilitate the exchange of communication between the deaf community and hearing users who do not have access to or utilize a TDD device. In the United States, telephone companies have set up a service referred to as a "relay." A relay, as the term is used herein, refers to a system of voice to TDD communication in which an operator, referred to as a "call assistant," serves as a human intermediary between a hearing user and a deaf person. Normally the call assistant wears a headset that communicates by voice with the hearing user and also has access to a TDD device which can communicate to the deaf user using a TDD appropriate protocol. In normal relay operations in the prior art, the call assistant types at a TDD keyboard the words which are voiced to her by the hearing user and then voices to the hearing user the words that the call assistant sees upon the display of his or her TDD. The call assistant serves, in essence, as an interpreting intermediary between the deaf person and the hearing person to translate from voice to digital electronic forms of communication.

To facilitate and modernize the systems available for providing telecommunication services for the deaf, efforts have been made to both update the techniques for providing assistance to the hearing impaired as well as providing services to users who are modestly hearing impaired but not deaf. In U.S. Pat. No. 5,909,482, a relay is described which uses a re-voicing technique and a speech recognition engine to greatly improved the speed of services provided by a relay. This patent also discloses a small portable device, called a personal interpreter, which make possible providing location independent and instantaneously available interpreting services to the deaf. In U.S. Pat. No. 6,075,842, methods and devices for providing text enhanced telephony are described in which a text stream is provided along with voice in telephone communications with hard of hearing users. The text stream is used to provide the assisted user with a visual representation of the text of what is said by the other person in a communication session, so as to gently assist a person with some hearing deficiency in using the telephone. The full specification of U.S. Pat. Nos. 5,909,482 and 6,075,842, as well of that of each other patent referred to in this document, is incorporated herein by reference.

BRIEF SUMMARY OF THE INVENTION

The present invention is summarized in a method for transmitting voice and text of words over a telephonic connection between a hearing user and an assisted user through a relay, the method including the steps of digitizing the voice of the hearing user; creating a digital text at the relay corresponding to the words spoken by the hearing user; combining the digitized voice and the text into combined digital data packets, each packet including a format character indicating the type of format for that packet, at least some of the digital data packets combining at least one byte of digitized voice data with at least one byte of text representing a character in the text of the words spoken by the hearing user; and transmitting the combined packets to the station of the assisted user over a telephone connection so that the station can reconstitute both voice and text from the digital data packets for the assisted user.

The present invention is also summarized in a communication system using that method to communicate voice and text of the words spoken by the voice to a station used by an assisted user.

The present invention is intended to create a flexible communication protocol, using minimal overhead, which is capable of sending voice and the text for the words spoken by that voice, in digital form over common telephonic communication linkages.

Other objects, advantages and features of the present invention will become apparent from the following specification when taken in conjunction with the accompanying drawings.

DETAILED DESCRIPTION OF THE INVENTION

The communication protocol of the present invention is intended to facilitate voice and text communications between hearing persons and assisted persons by a relay that intermediates the call. Since the full implementation of the protocol is most appropriately done by a relatively sophisticated relay, the construction of such a relay and some details about the device at the assisted users end will be described first.

Figure 1:
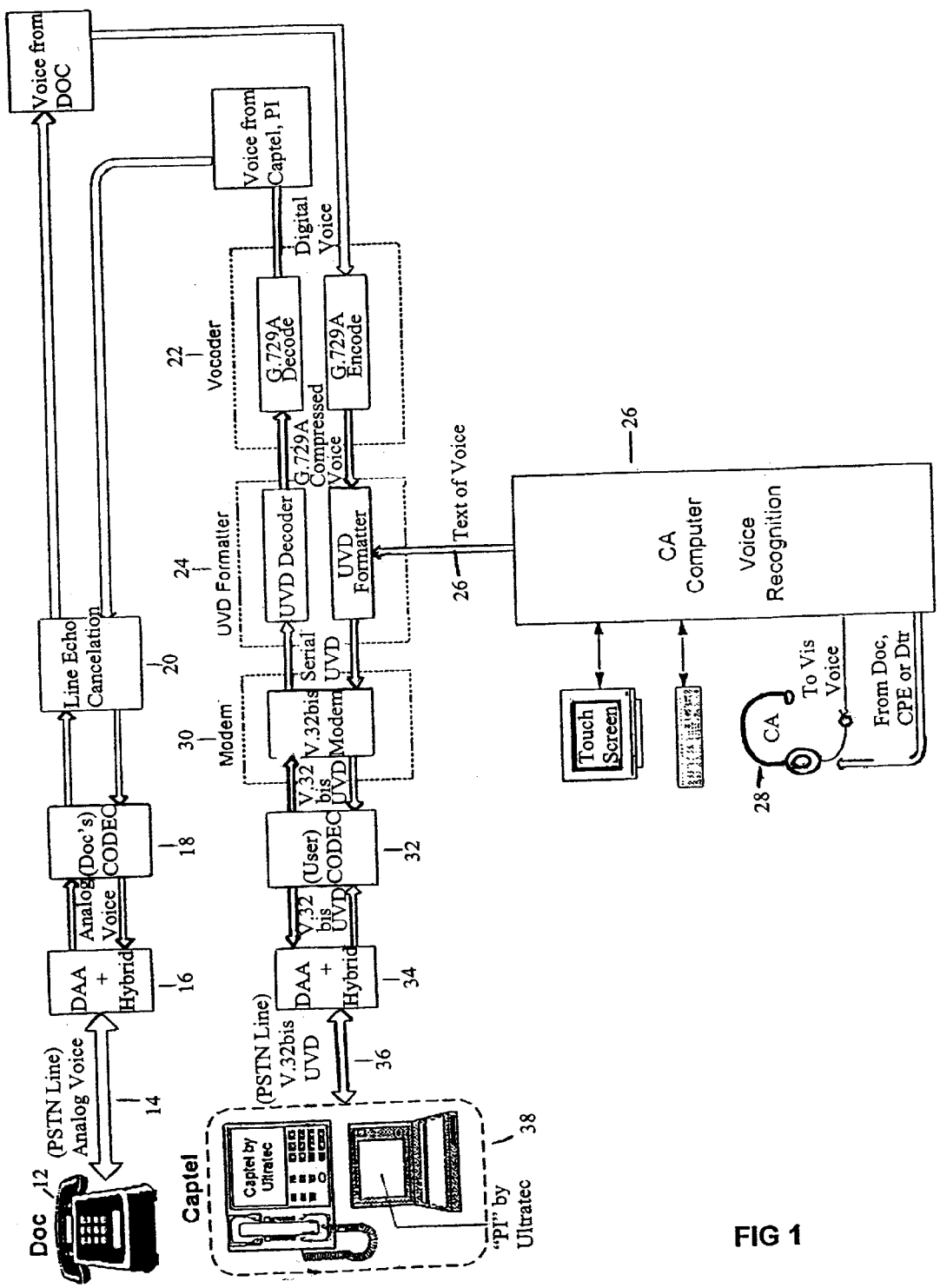
FIG. 1 is a schematic diagram of a system using the method and protocol of the present invention, showing particular details of the exemplary relay used in the system.

Shown in FIG. 1 is a schematic view of the relay which can intermediate such a call. At 12 is indicated the normal telephone of the hearing user. The telephone 12 connects through a telephonic connection 14 to a DAA and hybrid circuit 16 at the relay. It is envisioned that the hearing user's telephone 12 can be any of the devices generally thought of by laypersons as a telephone, including but not limited to land line telephones, cellular telephones, PCS devices and audio links over the internet. At any event, what is received at the DAA and hybrid circuit 16 of the relay is a voice signal. The voice from the DAA and hybrid circuit 15 is connected as the input to a codec 18. Codecs have become industry standard devices that convert an analog signal, such as analog voice, into digital data. Commercially available codec integrated circuits, such as those from Texas Instruments and Analog Devices, can convert both analog voice signals into digital data and do the reverse, i.e. reconstruct an analog voice signal from digital data representing voice. The output digital signal from the codec 18 is then connected to a circuit or software designed to cancel echo on the telephone line, as indicated at 20.

Another type of communication circuit in common use today is referred to as a voice coding and decoding circuit or "vocoder. " A vocoder is a type of digital signal processing chip or an algorithm implemented by a processor specifically designed to transform digital data carrying voice to compress the data for transmission. There are several common standards for vocoders so that telephones from different manufacturers using digital transmission formats can communicate with each other. Such formats include GSM, G.729, and G. 723. One preferred format for the relay of the present invention is G. 729, which encodes speech into 8000 bits per second with an audio quality comparable to a long distance telephone line. This format, and the 8000 bit per second data rate, enables the communication protocol of the present invention to be used even over cellular telephone connections. The vocoder is indicated at 22, and is capable of both encoding, or compressing, and decoding, or de-compressing, the digital data stream carrying voice.

Indicated at 24 is the UVT formatter, which is actually implemented electronically by a specially programmed microprocessor or digital signal processor. The UVT formatter 24 combines the digital data stream representing voice, from the vocoder 22 with a digital data stream carrying text from a call assistant computer, indicated at 26. The call assistant computer 26 is a general purpose digital computer preferably equipped with a speech recognition software package. The cell assistant wears a headset 28 connected to transmit the voice of the hearing user to the ear of the call assistant. The call assistant repeats, or "re-voices," the words spoken by the hearing user into a microphone of the headset 28 that is connected to the computer 26. The speech recognition engine in the call assistant computer 26 recognizes the voice of the call assistant and translates that voice into a text stream. The output of the call assistant computer 26 is thus a digital data stream carrying text which is provided to the UVT formatter 24 as well. The UVT formatter is constructed to combine the digital data stream carrying voice with the digital data stream carrying text, using the UVT format described below. The UVT formatter is also capable of doing the reverse, that is, separating the digital data stream carrying voice from the digital data stream carrying text, using information contained in the UVT protocol to make that separation.

The output of the UVT formatter 24 is connected to a modem 30, in this case illustrated as an industry standard V.32bis format modem. The output of the modem 30 is connected through another codec 32 to a hybrid circuit 34 and DAA at the output of the relay. The DAA and hybrid circuit 34 is connected, by any form of telephonic connection 36 to an assisted user station 38. The assisted user station 38 can be a personal interpreter of the general type as shown in U.S. Pat. No. 5,974,116, or a captioned telephone of the general type as shown in U.S. Pat. No. 6,075,842, or any other device intended to assist the assisted user in the communication session by providing text to the assisted user to help that user understand the words spoken by the hearing user.

Figure 2:
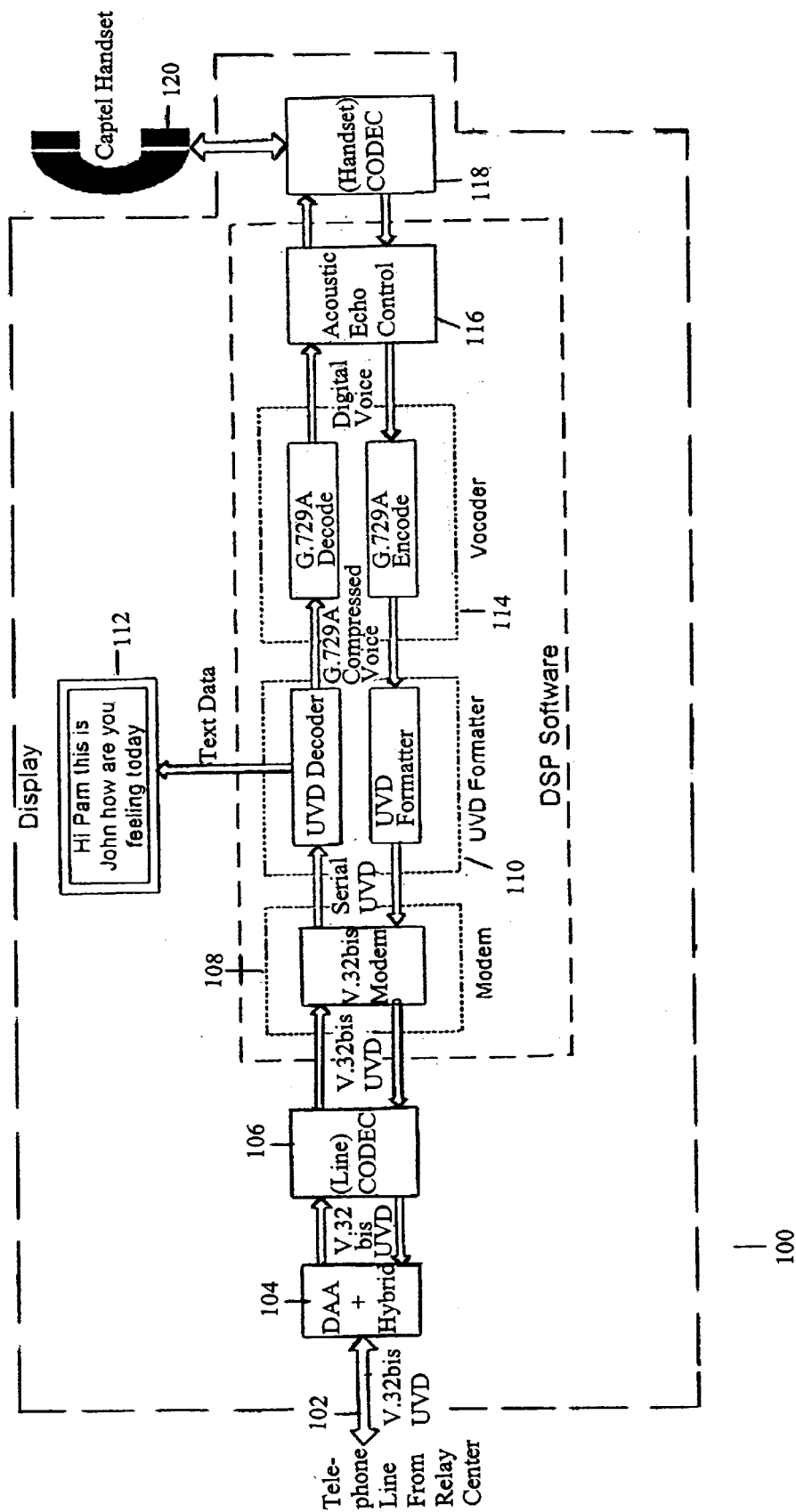
FIG. 2 is a schematic diagram of a captioned telephone for use in the system of FIG. 1.

Whether the protocol of the present invention, here sometimes referred to as "UVT," is used with a personal interpreter or a captioned telephone, the assisted user station needs to be able to receive and process the type of packets sent by the relay. Shown in FIG. 2 is a captioned telephone device 100 with that capability. In FIG. 2 the interior components of the captioned telephone device 100 are illustrated in block diagrams indicating the digital logic components from which the device may be constructed. It is preferred, however, that the components within the dotted lines in FIG. 2, labeled as DSP software, actually be implemented in the form of a software routine operating a digital signal processing integrated circuit to perform the functions of the illustrated blocks. In the captioned telephone 100, the telephonic connection to the relay is indicated at 102. The input telephonic signal connects to a DAA and hybrid 104 and then to a codec 106 to digitize input signals. Following the codec 106 is modem 108, the output of which connects to a UVT formatter 110. The UVT formatter 110 operates to separate the digitized voice signals from the digital text signals. The digitized text signals are transferred from the UVT formatter to a visually readable display 112 on which the text can be displayed for the assisted user. The digitized voice signal is transferred from the UVT formatter 110 to a vocoder 114, compatible in format to the vocoder used in the relay of FIG. 1, in this case using format G.729A. The output of the vocoder 114 is connected through an acoustic echo control 116 to another codec 118 which reconstructs the analog voice signal for delivery to the handset 120 of the assisted user. In summary, the assisted station decompressed the digital data stream and separates the digital text data from the data representing digitized voice. The text is displayed on the display 112 and the voice is reconstituted into analog and played on the speaker in the handset 120. The assisted user thus receives both the voice of the hearing user and is provided a text display of the words spoken by the hearing user.

In the basic operation of the system illustrated in FIG. 1, the hearing user at telephone 12, and that person's voice is converted into digital form in the relay, that digital form being a direct digitalization of the hearing person's voice. At the same time, or at very nearly the same time, the call assistant computer creates a text data stream, also in digital form, of the text of the words spoken by the hearing person. The UVT protocol, implemented by the UVT formatter 24 in the system of FIG. 1 provides a methodology to efficiently combine the two digital data streams, one for voice one for text. The two digital data streams are combined in a method that is convenient to create and transmit and convenient as well to separate at the receiving end. The problem in combining the two digital data streams is that the digitized voice tends to require much more data to transit than the text data stream. It is inconvenient, however, to interrupt the transmission of voice to transmit the needed text data. It is also important that the total data transmitted not exceed the carrying capacity of any of the forms of telephonic connections supported by the network. The solution described here is to continually send formatted information packets carrying the digitized voice to the remote station and then, in addition and as needed, some of the data packets are flagged to carry a portion of the digital text message data stream in the same packet. Since the data transmission requirements for the text message are so small in comparison to that of the digitized voice, single bytes of text message are combined with multi-byte portions of digitized voice data in these specialized data packets. It is a unique attribute of the data packets described here that the packets carry digitized voice and at the same time carry text data for the words contained in the speech of the voice. In other words, digitized voice and digitized text for the words spoken by that voice are carried in common digital data packets. The text and voice may be delivered simultaneously or near simultaneously. The text can be delivered to the assisted user as the text stream is created by the computer of the call assistant, in which case the text stream may lag the corresponding voice signal by a brief delay. In that event, the text character may not travel in the same packet as the voice for the word of which the character is a part. As an alternative, it is possible to slightly delay the transmission of the voice of the hearing user through the relay so that the text and corresponding voice are transmitted to the assisted user at approximately the same time.

To accomplish these unique objectives, a new protocol for voice and text transmission has been designed. This format uses a single format of data packet, sent as a digital data packet, but the packets do not all carry the same type of content. Some packets carry only digitized voice, while other packets carry both digitized voice and digital text data. The packet header is used to indicate the type of packet, and as long as the designation of the packet header remains constant, later revisions of the format permit other later packet specifications to be defined. Other packet types include software upgrade data, user preferences for system set-up, settings for parameters of devices or for configurations, and error code information. Typically, at the initiation of the communication session, special packets are transmitted between the communicating devices. Such special packets can be used to identify the version number of the protocol used by the communicating devices, information on the type of connection and speed, information of the type of data in following data packets, error correcting formats or codes, device status such a processor of memory resources available, or information on the downloading of software upgrades to devices.

Each call to the relay service begins with an exchange of special packets that allow the captioned telephone or personal interpreter to provide the relay service with the information necessary for the relay to automatically set-up the desired type of service and, for captioned telephone calls, to complete the connection to the hearing person. When the data communication connection (e.g. V.32bis) is established, the relay service sends a special packet called a Request for Call Set-up Information packet. The captioned telephone or personal interpreter device responds with a special packet in return, here called the Call Set-up Information Block packet. The Call Set-up Information Block packet includes the service type requested by the user (e.g. captioned telephone or personal interpreting), a user identification number, a user password in some cases, and, for a captioned telephone call, the telephone number of the hearing party. In relays as operated in the prior art, the user had to type in information of this type, in response to inquiries from the call assistant, to complete the call set-up. This protocol permits the call to be set up automatically in a fraction of the time previously required.

Another type of special packet is used to transmit DTMF control signal to the relay equipment. A captioned telephone user may dial, using the relay service, a telephone number that connects to an automated attendant or voice response unit. These automated attendant type devices prompt the caller to enter their choice by pressing the number buttons on the their touch-tone telephone, i.e. "press 1 for sales." Such devices and voice mail systems are commonly encountered in telephone usage today. In current relays, a TDD user must type instructions to the relay call assistant to convey their intention, e.g. "press 1," and the call assistant then manually presses a key to produce the DTMF signal on the second line. The delays involved when the TDD user types to the call assistant and the call assistant manually selects the digit often exceeds the time permitted by the automated systems for the user to make a selection. In this event, the traditional relay call assistant must dial back the telephone number and wait for the system to reach the point to enter the user's choice. The problem can result in multiple calls and long time delays for prior art relay users.

The DTMF special packet in the present format provides the captioned telephone user with the functionality of a traditional touch tone telephone in the digital captioned telephone environment. The captioned telephone connects to the relay service using a data communications protocol (e.g. V.32bis) which does not permit the captioned telephone to emit the DTMF tones directly onto the telephone line. The captioned telephone could generate the DTMF tone signal and transmit that signal to the vocoder. Such a signal would be carried as digital data to the relay equipment where it would be converted back to tones. However, most vocoders cannot produce a precise enough set of frequencies or loud enough signals to meet network DTMF standards. To avoid that limitation, the present protocol permits the transmission of the special DTMF packet that instructs the relay to produce the DTMF signal directly on the telephone line to the other party. To use this feature, the captioned telephone user simply presses the numerical dial of his or her telephone, and the captioned telephone then generates a command packet to the relay instructing it to produce the correct DTMF tones on the second telephone line automatically without interaction with the call assistant.

The embodiments of FIGS. 1 and 2 are illustrated with telephonic connections between the hearing person and the relay and between the relay and the assisted user. It is specifically contemplated that the manner of actual telephonic connection between these parties, and the number of telephone lines or telephone line equivalents that are used is not important. The term telephonic connection, as used here, is intended to apply to actual dedicated a connections through the telephone system, such as land-lines or analog cellular connections. The term is also intended to encompass other types of connections that can serve as telephonic connections in the lay sense of the term, such as digital cellular telephone service, PCS service and communication over the internet using IP protocol. The term telephone line here is intended to encompass both traditional twisted pair physical telephone lines as well as any type of channels or software sockets that provide an equivalent connection between users of the telephone system. So while the use of the protocol described here is particularly intended to make possible transmission of text and voice using a minimal number of telephone lines, it is envisioned that the protocol may be used using two or more telephone lines or over other higher bandwidth forms of interconnection. Examples of such higher bandwidth connections include ISDN or DSL telephone connections, or other standards that provide a bandwidth more than the equivalent of one telephone line. Another example is the use of the present or future internet system, such as the present IP format, that permits communication sessions analogous to present telephone system sessions through computer to computer linkages.

One specific multiple line arrangement is specifically contemplated whereby the assisted user receives a telephone call from a hearing user over a telephone line, and then that assisted user conferences to the relay to obtain text assistance for the call. The assisted user would communicate with the relay in the UVT format described here. The connection to the relay could be by a second telephone line which carries voice to the relay and transcribed text back to the assisted user, using the UVT format. The connection to the relay could also be accomplished by conferencing in the relay on the line the call was received on and then arranging a separate telephonic connection between the assistance device of the assisted user and the relay to transmit text. While these sorts of connections might not make use of all of the capabilities of the UVT format, since they may not require voice and text on the same telephone line (or in the same packets), it may still be useful to employ the UVT protocol for such services. Once a relay is set up to communicate in UVT protocol, in order to support single line calls, and assuming only that the set-up options of the protocol for the relay are defined to support multiple line calling arrangements, it may be convenient to use this same UVT protocol for the multiple line calls. In that event, text only packets can be defined and sent using the same basic format as described here for text and voice packets.

The specification of the UVT data packets begins with the basic packet header. The standard packet begins with two special characters, each of one byte (eight bits). The first byte is a specially designated packet initiation signal, indicated here as 0xda, which is the 8 bits hexadecimal character DA. This first byte just indicates the start of a packet. The second special character is a single byte indicating the type or format of data packet. This is the data packet format type and is indicated in the following description using the nomenclature 0x09, which indicates a type 9 (hexadecimal format) packet format.

Thus the structure of a type 9 data packet is as follows:

In this representation, the packet start is the special character, hexadecimal value DA. The second byte is an indication of the packet type, in this case type 9. That packet type is defined as a single byte of text data, followed by two frames each of 80 bits (10 bytes) of digitized speech data. The packet type also defines the type of compression on the speech data, in this case G.729A digitized speech standard. The designation 0xNN indicates any 8 bit value.

| A type 19 UVT data format is defined as follows: | | | |
| --- | --- | --- | --- |
| Start packet | Packet format | Speech format | Speech frame |
| 0xda | 0x19 | 0xNN | 0xNN ... |
| 8 bits | 8 bits | 80 bits | 80 bits |

A type 19 data packet is defined like data packet nine, except that a text character is not included. Thus this data packet is used when no text data needs to be sent, so includes only speech in format G.729A.

This UVT protocol is thus able to mix the transmission of both text and voice data. While there is a connection between the parties, packets of voice (or sounds) are continuously transmitted. As the hearing party speaks, the words spoken by the hearing person are transcribed into text at the relay and the relay combines voice data and text data for transmission to the assisted user. This protocol requires very little overhead, as little as two bytes per packet, one start character and one to indicate the packet type. This is preferable to the alternative, sending text and voice in separate packets, since that would require the additional overhead associated with sending another packet (start of packet and packet type) for the text characters. This format permits transmission of voice and text at a steady transmission rate of 9,600 bits per second. This allows the protocol to be used over analog cellular telephone systems that currently support only 9600 baud. At this relatively slow speed, there is simply not enough time to send a speech packet followed by a text data packet.

The fact that text and speech packets are combined means that loss of a packet is not a significant problem. Since each packet only contains a time period of 0.010 to 0.020 seconds, and the omission of the speech from such a time period would not usually be noticed by the hearing users. Since loss of a packet means loss of only a single text byte, only one character is lost from the text data transmitted to the assisted user. Assisted users are accustomed to correcting mentally for informal and erroneous spellings, and so in most instances the loss of a single character should not cause serious disruption of the conversation. If the text was sent in separate packets, the loss of a packet could lose a significant amount of text information.

Larger blocks of text can be sent in a variable length text only packet. This may be used to transmit prompts to the user's device during call set-up or at other times when it is not necessary to carry voice data. Examples of when such a packet might be used include indicating to the assisted user

| Start of packet | Packet format | Text character | Speech frame 1 | Speech frame 2 |
| --- | --- | --- | --- | --- |
| 0xda | 0x09 | 0nNN | 0xNN ... | 0xNN ... |
| 8 bits | 8 bits | 8 bits | 80 bits | 80 bits | that the captioning device is on-line or indicating when the outbound telephone call has been completed. This type of packet is referred to here as a type 1D (again hexadecimal notation) packet, which is specified as follows:

| Start of packet | Packet format | Sequence number | Length | Characters | CRC |
| --- | --- | --- | --- | --- | --- |
| 0xda | 0x1d | 0xNN | 0xNN | 0xNN | 0xNN |
| 8 bits | 8 bits | 8 bits | 8 bits | 8 bits × length | 8 bits |

The sequence number is simply an ordering of the sequence of packets which together form a single message. Length refers to the number of characters in this packet. The notation CRC refers a type of commonly used error-checking methodology (cyclic redundancy check) that may be used to conveniently perform error-checking in this packet type.

Other types of command and control packet types are used to initiate the service and for other specialized functions. Examples of these are described next.

The packet transmitted by the relay service to the calling device, to request the transmission of call set-up information, is referred to here as a type 20 packet. The format of a type 20 packet is as follows.

| Start of packet | Packet format |
| --- | --- |
| 0xda | 0x20 |
| 8 bits | 8 bits |

When the relay service sends the type 20 packet to the calling device, the calling device should respond with a type 21 packet. A type 21 packet is intended to provide call set-up information to the relay service to specify the type of service and service options to be used on the call. These options can be implemented in the calling device as pre-selected parameters that are automatically transferred to the relay when a defined type of call (e.g. a captioned telephone call) is initiated. The format of the type 21 packet, or call set-up information block packet, is as follows:

| Start of packet | Packet format | Dial through number | ; | Service type | ; | ID number | ; | Password | CR | CRC |
| --- | --- | --- | --- | --- | --- | --- | --- | --- | --- | --- |
| 0xda | 0x21 | DT=1608 2385400 | 0x3b | S=2 | 0x3b | U=1234 5678 | 0x3b | P=x456 | 0x0d | 0xNN |
| 8 bits | 8 bits | Variable | 8 bits | 8 bits | 8 bits | Variable | 8 bits | Variable | 8 bits | 8 bits |

In this format, the call set-up information is provided in 8 bit ASCII characters. Some of the fields are of variable length and therefore are separated by a special character ";" or 0x3b which is intended only to serve as an indicator of the end of a variable length field. A "CR" (0x0d) character indicates the end of all of the variable length data fields. Each data filed begins with a filed type indicator, such as the indicator "DT=" indicates that the characters following make up a dial through telephone number. This allows the fields to be sent in any order and permits unused fields to be omitted altogether. It is then also possible to define new filed types at a later time by selecting a new filed type indicator and separating the new filed from others by the ";" indication. A CRC is again used to confirm the accuracy of the data within the information block by permitting an error check to be performed.

A UVT command packet for DTMF information includes the identification of the DTMF digit tone to be produced, the duration of the tone, and a CRC. The DTMF digit information indicates to the relay which DTMF digit signal to produce, the duration indicates how long the relay equipment should produce the signal and the CRC again is for error checking. When the captioned telephone user presses a number button on his or her device during a captioned telephone call, the captioned telephone device sends a UVT DTMF command packet to the relay. The relay then generates the DTMF tone on the telephone line to the other party. This tone will sound to all users like the normal DTMF tones produced by a conventional telephone. As long as the user holds down the button, the captioned telephone device will continue to send such UVT DTMF command packets to the relay, and the relay will continue to impress DTMF tones on the telephone line to the other party. Thus, as in traditional telephone systems, the user can control the length of time that the DTMF tone is sent. The captioned telephone will normally select a duration for each DTMF command packet that is longer than twice the interval between transmission of DTMF command packets to the relay, so that the DTMF tone continues from the relay even if a single packet is missed or corrupted in some way. The format for packet type 1C (again hexadecimal notation) is as follows:

| Start of packet | Packet format | DTMF digit | DTMF duration | CRC |
| --- | --- | --- | --- | --- |
| 0xda | 0x1c | 0xNN | 0xNN | 0xnn |
| 8 bits | 8 bits | 8 bits | 8 bits | 8 bits |

Note that is not required that each packet be in the same format. Since the identification of packet type travels with the packet, packets that carry only voice can be interspersed with packets carrying voice data and text without disruption or difficulty. This also permits housekeeping packets, about machine settings or protocols, to be transmitted at the beginning of the communication session, or during lulls, without creating confusion.

It is to be understood that the present invention is not limited to the embodiment described above, but embraces all such modified forms thereof as come within the scope of the following claims.

We claim:

1. A method for transmitting voice and text of words over a telephonic connection between a hearing user and an assisted user through a relay, the method comprising the steps of digitizing the voice of the hearing user;

creating a digital text at the relay corresponding to the words spoken by the hearing user;

combining the digitized voice and the digital text into combined digital data packets, at least some of the digital data packets combining at least one byte of digitized voice data with at least one byte of text representing a character in the text of the words spoken by the hearing user; and transmitting the combined packets to the station of the assisted user over a telephone connection so that the station can reconstitute both voice and text from the digital data packets for the assisted user.

2. A method as claimed in claim 1 wherein for each digital data packet, the first byte is a hexadecimal DA.

3. A method as claimed in claim 1 wherein each data packet includes within it a format character indicating the format of that packet.

4. A method as claimed in claim 3 wherein for each digital data packet, the second byte is the format character indicating the format of that digital data packet.

5. A method as claimed in claim 3 wherein some of the data packets contains only digitized voice and some of the data packets combine digitized voice with a text character, the nature of the data in each packet indicated by the format character.

6. A method as claimed in claim 3 wherein at least one data packet is defined to carry call set-up information from the assisted user to the relay.

7. A method as claimed in claim 3 wherein at least one format of data packet provides for the transmission of a DTMF command from the assisted user to the relay to command the relay to transmit a DTMF tone on the telephone connection to the hearing user.

8. A system for assisting a user in telephonic communications with a hearing user, the system adapted to communicate with an assisted user station capable of displaying text for the assisted user, the system comprising a relay capable of converting spoken voice received over the first telephonic connection into text;

a first telephonic connection between the hearing user and a relay;

a second telephonic connection between the relay and the station of the assisted user;

the relay programmed to created a series of digital data packets for transmission to the station of the assisted user over the second telephonic connection, each of the digital packets including digitized voice of the hearing users and at least some of the digital data packets including text of the words spoken by the hearing user.

9. A system as claimed in claim 8 wherein for each digital data packet, the first byte is a hexadecimal DA.

10. A system as claimed in claim 8 wherein each packet includes a format character indicating the format of that particular packet so that packets of varying format can be transmitted in a single communication session.

11. A system as claimed in claim 10 wherein for each digital data packet, the second byte is the format character indicating the format of that digital data packet.

12. A system as claimed in claim 10 wherein some of the data packets contains only digitized voice and some of the data packets combine digitized voice with a text character, the nature of the data in each packet indicated by the format character.

13. A method as claimed in claim 10 wherein at least one data packet is defined to carry call set-up information from the assisted user to the relay, the content of that packet being indicated by the format character in the packet.

14. A method as claimed in claim 10 wherein at least one format of data packet provides for the transmission of a DTMF command from the assisted user to the relay to command the relay to transmit a DTMF tone on the telephone connection to the hearing user.

15. A system as claimed in claim 8 wherein the station of the assisted user is a captioned telephone, operating as an analog telephone but also capable of displaying the text of the words spoken by the hearing user for the benefit of the assisted user.

16. A system as claimed in claim 8 wherein the station of the assisted user is a portable personal interpreted device capable of providing the assisted user with a visual display of the text created at the relay from the words spoken by the hearing user.

17. A method capable of transmitting both voice and text of words over a telephonic connection to facilitate a conversation between two users, the method comprising the steps of digitizing the voice of a first of the users;

generating a digital text corresponding to the words spoken by the first of the users;

combining the digitized voice and the digital text into digital data packets, at least some of the digital data packets having at least one byte of digitized voice data and at least some of the digital data packets having at least one byte of text representing a character in the text of the words spoken by the first user, each packet including a format character indicating the format of that packet so that packets of differing format can be sent in a single communication session; and transmitting the combined packets to the station of the second user over a telephone connection so that the station of the second user can supply text to the second user of the words spoken by the first user.

18. A method as claimed in claim 17 wherein for each digital data packet, the first byte is a hexadecimal DA.

19. A method as claimed in claim 17 wherein for each digital data packet, the second byte is the format character indicating the format of that digital data packet.

20. A system as claimed in claim 17 wherein some of the data packets contains only digitized voice and some of the data packets combine digitized voice with a text character, the nature of the data in each packet indicated by the format character.

21. A method as claimed in claim 17 wherein at least one data packet is defined to carry call set-up information from the assisted user to the relay, the content of that packet being indicated by the format character in the packet.

* * * * *